United States Patent [19]
Dong

[11] Patent Number: 6,065,217
[45] Date of Patent: May 23, 2000

[54] LASER ROTARY DOUBLE CROSSLINER

[76] Inventor: Dawei Dong, P.O. Box 4697, Santa Clara, Calif. 95056

[21] Appl. No.: 08/990,152

[22] Filed: Dec. 12, 1997

[51] Int. Cl.[7] .................................................. G01B 11/26
[52] U.S. Cl. ............................... 33/290; 33/276; 33/286; 33/DIG. 21; 356/138
[58] Field of Search .............................. 33/290, DIG. 21, 33/276, 227, 278, 286, 280, 275 R, 567, 567.1; 356/138, 140, 144, 145, 146, 399, 247, 400

[56] References Cited

U.S. PATENT DOCUMENTS

| | | | |
|---|---|---|---|
| 3,462,845 | 8/1969 | Matthews | 33/286 |
| 4,333,242 | 6/1982 | Genho, Sr. | 356/138 |
| 4,751,782 | 6/1988 | Ammann | 33/DIG. 21 |
| 5,218,770 | 6/1993 | Toga | 33/DIG. 21 |
| 5,505,000 | 4/1996 | Cooke | 33/DIG. 21 |
| 5,539,990 | 7/1996 | Le | 33/DIG. 21 |
| 5,748,306 | 5/1998 | Louis | 356/247 |
| 5,864,956 | 2/1999 | Dong | 33/DIG. 21 |

FOREIGN PATENT DOCUMENTS

| | | | |
|---|---|---|---|
| 4-242113 | 8/1992 | Japan | 33/276 |
| WO 91/02217 | 2/1991 | WIPO | 33/286 |

*Primary Examiner*—Andrew H. Hirshfeld
*Attorney, Agent, or Firm*—The Kline Law Firm

[57] ABSTRACT

A laser crossline device suitable for construction includes at lease a first and a second laser beam produced by diode modules. The diode modules revolve around a horizontal axis so as to form a 360° laser scanning plane that is perpendicular to the horizontal axis of the module. The plane can be adjusted with a bubble level and an adjustment screw. The two modules are situated so as to generate planes that intersect at a right angle. The line of intersection forms a plumb line. If desired, a third orthogonal plane can be added to the device. A single rotary motor drives all of the diode modules.

3 Claims, 3 Drawing Sheets

LASER ROTARY DOUBLE CROSSLINER

BACKGROUND OF THE INVENTION

The present invention relates generally to linear instruments, and more particularly is a rotary laser linear instrument capable of multiple uses. The device can simultaneously produce two 360° scanning lines that cross each other and form crosslines suitable for construction.

Many years have passed since the laser was introduced into the construction industry. Laser rotary devices are the latest generation of instruments introduced for use in construction projects. The present invention provides builders with a unique and much more powerful instrument to do their work even more effectively. The Laser Rotary Double Crossliner produces two vertical crossing planes. The planes intersect to form 90° crosslines. The line of intersection also defines an accurate vertical line. The device is easy to carry about and use. It can be mounted on a tripod or simply put on the ground. Three C size batteries are used to power the device. When the device is activated, it produces two 360° vertically crossing scanning lines that are very useful in construction jobs such as erecting partitions, adjusting walls, mounting cabinets and doors or windows, installing decks and fencing, and any other job requiring a plumb or 90° right angle reference line.

SUMMARY OF THE INVENTION

A first laser beam is produced by an adjusted solid diode module. The diode revolves around a horizontal axis so as to form a 360° laser scanning plane that is perpendicular to the horizontal axis. The plane can be adjusted with a bubble level and an adjustment screw. A second diode of like construction is mounted on the unit so that the first unit and the second unit generate planes that meet at a right angle. The line of intersection also forms a plumb line. The two units are installed in one case. Through a pair of bevel gears, a rotary motor drives both units.

DETAILED DESCRIPTION OF THE PREFERRED EMBODIMENTS

Figure 1:
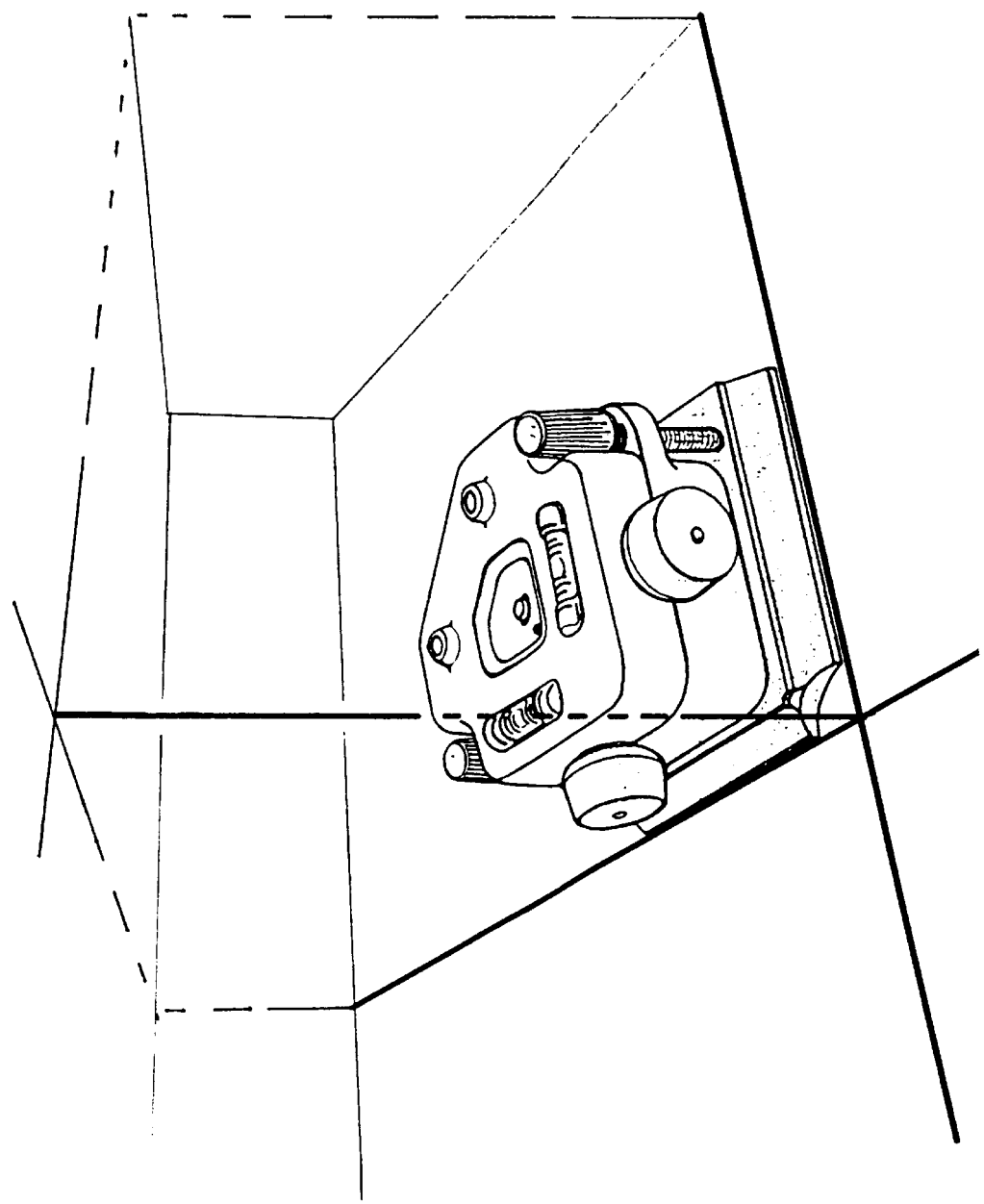
FIG. 1 illustrates the three-dimensional exterior of the laser rotary double crossliner and its operating condition.
Figure 2:
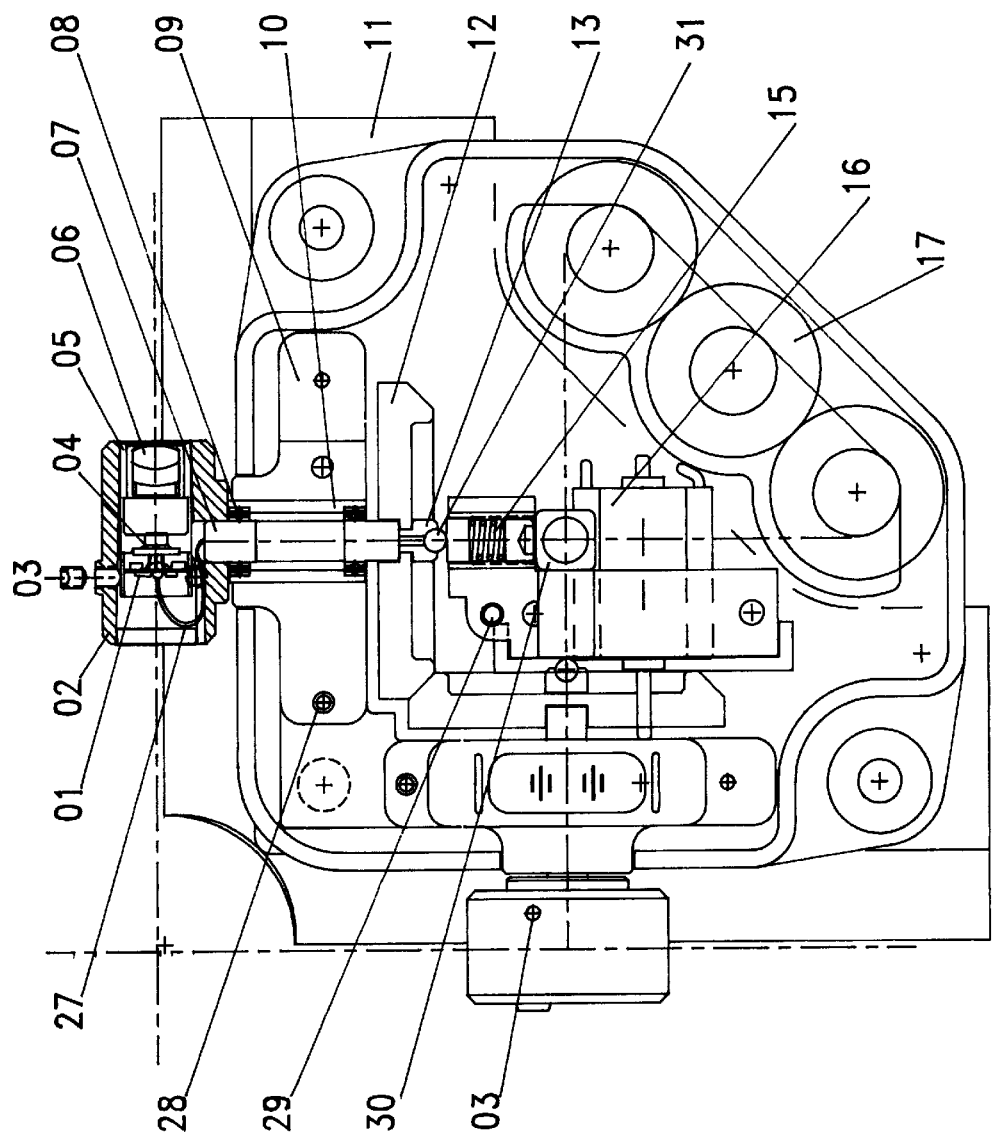
FIG. 2 is a top sectional view of the laser rotary double crossliner of the present invention.
Figure 3:
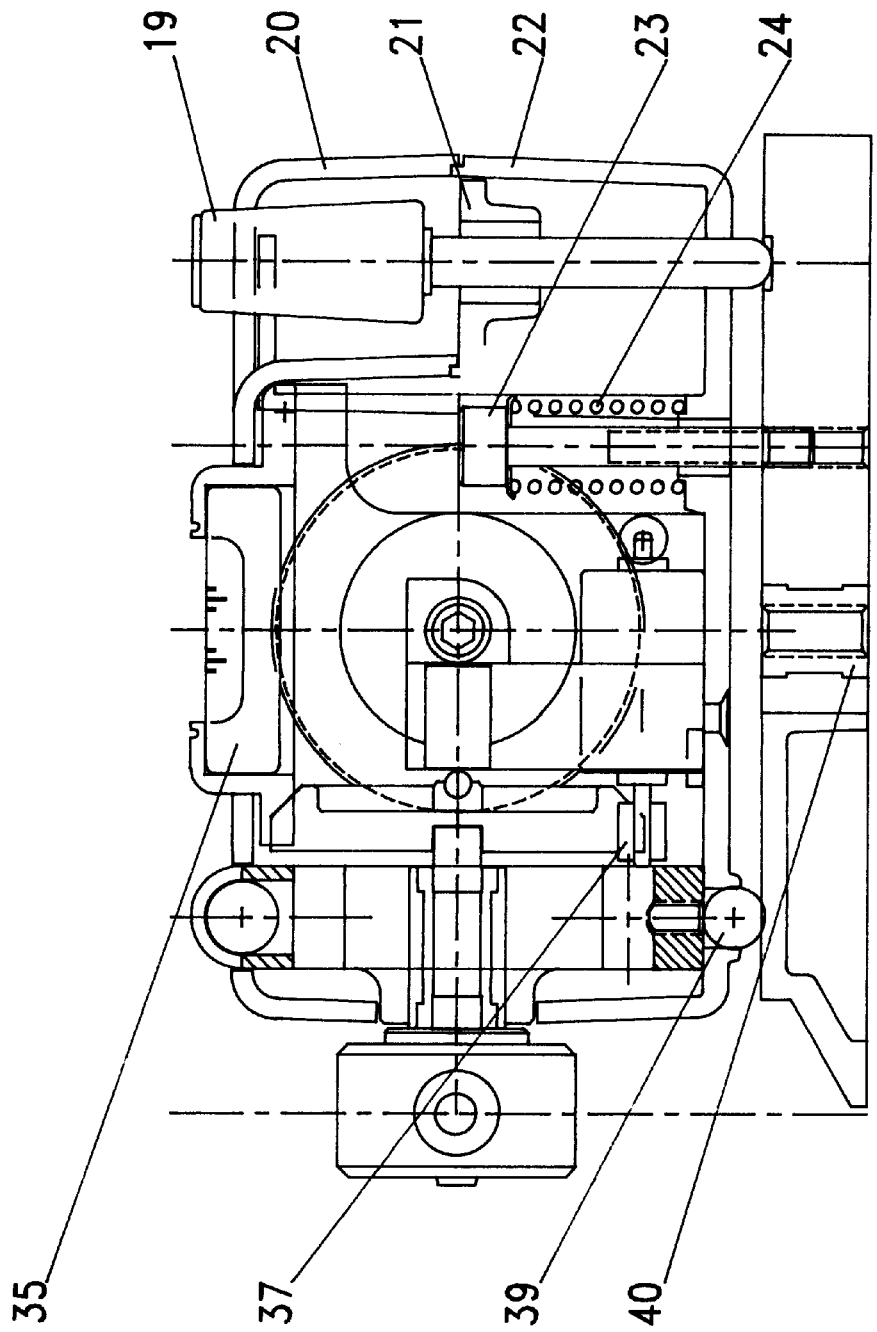
FIG. 3 is a top sectional view of the laser rotary double crossliner of the present invention.

The present invention is a laser rotary double crossliner. The device comprises at least two laser diode modules 2. Three of the laser modules 2 may be employed for specific applications if desired by the user. Each of the laser diode modules 2 are equivalent in construction, and so the structure and function described for one of the laser diode modules 2 will apply to all the modules in the device.

Each laser diode module 2 is controlled by an associated PCB 1. The laser diode module 2 includes a laser diode 4 and an achromatic glass lens 6 that allows the laser diode 4 to produce a focused line of light. The laser diode module 2 is enclosed in a copper case 5. The diode case 5 is mounted on a rotating axle 7. The axle 7 is supported by bearings 8 that are secured within a bearing casing 10. The casing 10 is formed from two die cast plates 9 that are secured to each other with screws 28. When the device is activated, the diode module 2 rotates on the hollow axle 7. An adjusting screw 3 exposed on the exterior of the diode module 2 allows the user to make certain that the diode 4 generates a line perpendicular to the centerline of the axle 7.

The components of the device are enclosed in a housing comprised of an upper half 20 and a lower half 22. The components and the housing are mounted on a base plate 11. The base plate 11 includes on a lower surface a tripod mounting means 40 to receive a tripod if the user wants to elevate the device.

The components and the housing are secured to the base plate 11 by means of securing screws 23. A spring 24 associated with each securing screw 23 urges the components and the housing into discrete contact points with a contact ball 39 and a levelling screw 19. The levelling screw 19 is turned to level the device after it is placed in position. Bubble levels 35 are positioned on a top surface of the housing of the device so that the user can easily determine when the device is properly levelled and ready for use.

The diode modules 2 are driven by an electric motor 16. The motor will typically be powered by batteries 17. The motor 16 drives a spur gear 37 that is linked to a bevel gear 12 affixed to a lower end of one of the axles 7. The bevel gears 12 of the diode modules 2 are in communication with each other so that all of the diode modules 2 are driven by a single motor 16.

The motor 16 also supplies the electrical power for the laser diodes 4. The electrical circuit comprises a negative lead wire 27 that passes through the hollow center of axle 7. The connection to the brush 15 of the motor 16 is made by a electrically conductive ball 31. To isolate the circuit from the axle, a nylon screw 13 is used to secure the bevel gear 12 to the axle 7. The device is turned on and off by a switch 30. An LED indicator 29 lights when the device is powered on and is in operation.

To use the laser rotary double crossliner, the user places the device at the location in which he needs the reference lines. The user levels the device with the levelling screws 19. The device is activated by the on/off switch 30, and power is supplied to the laser diodes 4 and to the motor 16 that drives the bevel gears 12, which cause the laser diode modules 2 to rotate. The rotation of the diode modules 2 creates a visual reference plane. If the device is one in which two diode modules 2 are installed, a pair of orthogonal planes is generated. If the device is one in which three diode modules 2 are installed, three orthogonal planes corresponding to the x-y-z axes are generated.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed:

1. A rotary laser light device comprising:
   at least two laser diode modules, each said laser diode module comprises means to generate a focused line of laser light,
   an electric motor,
   transmission means to transmit a driving force from said motor to said laser diode modules, and
   a housing mounted on a base; wherein
      said laser diode modules are rotatably mounted protruding from an exterior surface of said housing so that when said motor is activated, said motor drives said transmission means so as to rotate said laser diode modules, each said laser diode module thereby generating a laser light plane, and wherein
said light line of a first one of said laser diode modules is orthogonal to said light plane of a second one of said laser diode modules.

2. The rotary laser light device of claim 1 further comprising:

a first axle attached to said first laser diode module, and a second axle attached to said second laser diode module;

said circuit providing electric power to said laser diode modules comprises a lead wire passing through said hollow axles connected to said laser diode modules, said circuit being electrically isolated from said axles by mounting said axles on bevel gears with nylon screws.

3. The rotary laser light device of claim 1 wherein:

said laser diode modules are secured to said base by means of a plurality of spring loaded screws cooperating with spherical contact points and levelling screws, such that projecting directions of said laser diode modules are adjusted by said levelling screws.

* * * * *